UNITED STATES PATENT OFFICE 2,100,493

INSECTICIDE

Lloyd E. Smith and Houston V. Claborn, Washington, D. C., dedicated to the free use of the Public No Drawing. Application June 3, 1936,
Serial No. 83,310

4 Claims. (Cl. 167—30)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the public in the territory of the United States of America to take effect upon the granting of a patent to us.

This invention relates to improvements in materials for destroying or checking the growth or multiplication of living organisms, whether plant or animal, which are economically injurious to man.

An object of this invention is to provide a material for use as an insecticide.

Another object of this invention is to provide a material which is relatively nontoxic to man and warm blooded animals when taken by mouth and which can be used in place of lead arsenate and other arsenicals for destroying insects without leaving a harmful residue on fruits and vegetables.

We have found that organic compounds of the general formula

in which R is an aromatic nucleus and y represents hydrogen, an alkyl group, iodine or nitro group, are effective in killing many species of insects whether applied externally or internally; that these organic products may be sprayed or dusted upon delicate vegetation without injuring it; that these materials are even more toxic than lead arsenate and other commonly used insecticides and that they are relatively nontoxic to worm blooded animals.

Suitable products according to this invention are o-nitroiodobenzene, m-nitroiodobenzene, p-nitroiodobenzene, 2-nitro-4-iodotoluene, etc.

A commonly used method of preparing this class of compounds consists in diazotizing the corresponding amine with subsequent replacement of the diazo group by iodine in the usual manner.

The products formed by the above reaction may be reduced to an impalpable powder by grinding and applied to vegetation either dry as a dust or wet as a spray and the products being soluble in mineral and vegetable oils may be applied as a component of an oil emulsion spray. When applied as a spray in water it may be desirable to incorporate as an effective wetting agent, a material such as for example one of the sulfated high-molecular weight alcohols. These products may also be applied by dissolving the material in acetone or other suitable solvent soluble in water and then pouring the resulting solution into water whereupon a fine colloidal precipitate is formed.

For example tests with p-nitroiodobenzene, o-nitroiodobenzene and m-nitroiodobenzene gave the following results:

(1) In laboratory tests against codling moth larvae p-nitroiodobenzene, o-nitroiodobenzene and m-nitroiodobenzene were more effective than lead arsenate at the same concentration.

(2) In laboratory tests against silkworms and tent caterpillars p-nitroiodobenzene either as a spray or as a dust was more toxic than lead arsenate at the same concentration.

(3) When applied as a spray or a dust p-nitroiodobenzene had no harmful effect on bean or apple foliage.

It is to be understood that the above compounds were used in the above experiments merely as examples and that this invention is not restricted by such use.

Having thus described our invention, we claim:

1. An insecticide containing as its essential active ingredient a compound of the general formula

where R is a benzene nucleus and y represents hydrogen, an alkyl group, nitro group or iodine.

2. An insecticide containing as its essential active ingredient p-nitroiodobenzene.

3. An insecticide containing as its essential active ingredient m-nitroiodobenzene.

4. An insecticide containing as its essential active ingredient o-nitroiodobenzene.

LLOYD E. SMITH.
HOUSTON V. CLABORN.